US007097897B1

(12) United States Patent
Fredericksen et al.

(10) Patent No.: US 7,097,897 B1
(45) Date of Patent: *Aug. 29, 2006

(54) POWDER COATED STRAP AND METHOD FOR MAKING SAME

(75) Inventors: Dave Fredericksen, Palatine, IL (US); Al Suopys, Lindenhurst, IL (US); Jim Nelson, Naperville, IL (US); Max Zimbicki, Moon Township, PA (US); Christopher Merritt, Noblesville, IN (US); Dennis Rocheleau, Lakeville, MN (US)

(73) Assignee: Illinois Tool Works Inc., Glenview, IL (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 623 days.

(21) Appl. No.: 09/633,846

(22) Filed: Aug. 7, 2000

(51) Int. Cl.
*B32B 3/00* (2006.01)
*B32B 23/02* (2006.01)
*B32B 3/02* (2006.01)
*B32B 1/04* (2006.01)

(52) U.S. Cl. .......................... 428/156; 428/68; 428/76; 428/192

(58) Field of Classification Search ................ 428/172, 428/192, 76, 68, 125–127, 156; 118/634
See application file for complete search history.

(56) References Cited

U.S. PATENT DOCUMENTS 3,019,126 A 1/1962 Bartholomew ............... 117/17
4,100,883 A * 7/1978 Lupinski et al. ............ 118/630
4,243,729 A * 1/1981 Hascoe ....................... 428/577
4,601,958 A * 7/1986 Levine ....................... 428/672
4,666,796 A * 5/1987 Levine ....................... 428/670
4,737,418 A * 4/1988 Slattery ...................... 428/672
4,842,961 A * 6/1989 Basile et al. ................ 428/672
4,891,273 A * 1/1990 Odashima et al. .......... 428/623
4,901,666 A 2/1990 Nagasaka ................... 118/634
5,542,958 A 8/1996 Furukawa .................. 29/623.1

FOREIGN PATENT DOCUMENTS

DE 198 01 620 C 1 1/1998
EP 0 643 998 A2 3/1995

* cited by examiner

OTHER PUBLICATIONS

European Patent Office Search Report SNR07357EP Nov. 15, 2002 Application No. 01306457.0-2113-Entire Document.

*Primary Examiner*—Harold Pyon
*Assistant Examiner*—Catherine A. Simone
(74) *Attorney, Agent, or Firm*—Mark W. Croll, Esq.; Donald J. Breh, Esq.; Levenfeld Pearlstein, LLC

(57) ABSTRACT

A corrosion-resistant coated strap is formed from an elongated metal strap base element having a width and a thickness and defining first and second sides and a pair of edge regions. A coating is applied and cured onto the base element. The coating has a substantially consistent thickness at the first and second sides and at about the edge regions. A method for making the coated strap includes providing a metal strap and conveying the strap through a coating apparatus. A powder is electrostatically applied on the first side of the strap, which covers the first side and the opposing edges. The powder is applied on the second side of the strap, covering the second side and the opposing edges. The powder is melted to form a flowable material and is cured on the strap. The coating method is carried out in an in-line strap manufacturing process.

4 Claims, 3 Drawing Sheets

POWDER COATED STRAP AND METHOD FOR MAKING SAME

FIELD OF THE INVENTION

This invention is directed to coated high speed flat stock material. More particularly, the invention pertains to metal strapping material having a powder coating thereon and a method for making same.

BACKGROUND OF THE INVENTION

Strapping material is well known in the art. Such material is used for packaging, i.e. strapping goods, for example, to a pallet for transportation, storage and the like. Strapping materials, because they are used in such large quantities and are discarded after a single use, must be manufactured from relatively common materials in efficient, low-cost processes.

As will be recognized by those skilled in the art, often goods that are stored and or transported strapped to a base, such as a pallet, may be subjected to relatively severe environmental conditions. This is particularly true when the goods are transported overseas, such as by cargo ship. To this end, the severe environmental conditions may include exposure to saltwater and saltwater-laden air.

In addition, goods may be stored, in albeit less severe conditions, for prolonged periods of time. To this end, while the strapping may not be subjected to the severe conditions of saltwater-laden air, they may nevertheless be subjected to relatively high humidity environments.

It has been found that common steel strapping can corrode rapidly. That is, oxidation has been observed to begin almost immediately when the strapping is subjected to relatively high humidity conditions. Oxidation, i.e., rust can also compromise the integrity of the strap. In addition, it has been found that rust can stain or mar the appearance of the "strapped" goods. This is particularly problematic with appearance sensitive products. Coatings have been used to prevent or retard corrosion of the strapping. One type of corrosion inhibiting coating is a water based coating much like a paint. Although these coatings work to an extent, it has been found that the process of coating the strapping material results in inconsistent coating or coverage and as such localized areas of corrosion can be readily observed. In addition, it has been found that with painted strapping, regardless of the coating thickness, corrosion of the strapping may nevertheless occur under prolonged or lengthy exposure conditions. It will be recognized by those skilled in the at that various qualities of liquid coatings are available, and that their corrosion resistance characteristics will vary. Nevertheless, there are drawbacks and limits to their performance characteristics.

Conventional wisdom provides that powder coatings be cured at temperatures of about 350° F. to about 450° F. for about 5 minutes to about 10 minutes. This precludes powder coatings for strap in that typical manufacturing lines speeds (about 180 to about 220 feet per minute) would require a curing oven hundreds of feet in length.

In addition, in the manufacture of steel strapping, the side edges of the strap are sharp and can create a personal hazard. Typically, the strap is conveyed around or over V-type pulleys which can abrasively remove the strap material at the edges resulting in sharp edges. Moreover, the protective function of a coating can be compromised by abrasive removal of the coating at the edges.

It has also been found that strap often requires an additional or subsequent application of an agent, such as wax, to increase the "slip" value of the finished material. A slip value is the force necessary to tension the strap when used in a strapping machine, when the strap is secured at one end and pulled or tensioned at an opposing end around a load. Slip values of less than about 15 Newton-meters are required for reliable tensioning of the strap. The use and operation of such a strapping machine is more fully disclosed in Bobren, U.S. Pat. No. 5,097,874, which patent is incorporated herein by reference.

Accordingly, there exists a need for a coating for strapping material that provides an effective barrier against corrosion. Desirably, such a coating is applied in a cost effective and efficient process that is compatible with existing metal strap manufacturing processes which require high manufacturing speeds (i.e., line speeds). Most desirably, such coating is applied resulting in a substantially uniform thickness of coating on the strapping material and, if desired, an over-coating of the strapping edges.

SUMMARY OF THE INVENTION

A corrosion-resistant strap is formed from an elongated steel bare strap material having width and a thickness and defining first and second sides and a pair of edge regions. A coating is applied and cured onto the bare strap material. The cured coating has a substantially consistent thickness at the first and second sides and at the edges. Optionally, the coating has a greater thickness at about the edge regions and on the first and second sides adjacent to the edge regions, defining a dog-bone profile.

For purposes of the present description and the claims that follow, reference will be made to bare strap, coated strap and cured strap. Bare strap is the base material prior to the application of the coating material. It is essentially the uncoated material that results from the "traditional" strap manufacturing process. Coated strap is the bare strap having the coating applied thereto, prior to curing or hardening. Last, cured strap refers to the strap having the coating applied thereto and cured or hardened.

As provided herein, a strap in accordance with the present invention has been shown to exhibit corrosion resistance characteristics in various simulated environments that are far superior to commercially available liquid coated strap. In some cases, these characteristics are more than ten-fold, and even twenty-fold increases over the known products.

Preferably, the coating is applied as a powder that is melted and cured onto the strap base material. A current powder is an epoxy material. Other contemplated powder materials include polyesters, urethanes, hybrids and the like.

A method for making the cured strap includes the steps of providing a bare strap having first and second sides and opposing edges. The strap is provided from a source, and is conveyed from the source to a coating apparatus. In that the coating operation or process can be fully integrated with the traditional strap manufacturing process, the "source" can be the output of the strap making operation.

The bare strap or base material is directed through the coating apparatus. In a present method, the apparatus is oriented vertically so that the bare strap, coated strap and cured strap traverse upwardly through the apparatus. The apparatus can, however, be oriented horizontally or at any incline as well.

A powder is applied on the first side of the strap, which covers the first side and the opposing edges. The powder is likewise applied on the second side of the strap, covering the second side and the opposing edges. The method can include, when applying the powder to the first side, covering that portion of the second side immediately adjacent to the opposing edges, and when applying the powder to the second side, covering that portion of the first side immediately adjacent to the opposing edges. In this manner, there is a framing effect on the opposing side to that being covered. This results in a "dog-bone" profile of the coating on the bare strap.

The powder is melted to form a flowable material that coats the bare strap. The flowable material is cured on the strap, and the cured strap is cooled. The cured strap is then wound onto a storage member. When the vertical coating method is employed, the strap is preferably supported from only an uppermost point as it moves in the vertically upward direction. This prevents marring or damage to the newly applied coating.

The powder is applied using an electrostatic application process. Preferably, the powder is first applied to the first side of the strap and subsequently is applied to the second side of the strap. The coated strap is heated with the powder thereon as it moves through the apparatus.

In one method, an oven is provided for curing the coated strap. Preferably, heating occurs in a plurality of distinct heating zones within the oven. The method includes cooling the strap to a temperature of less than about 130° F., and preferably about 70° F. The powder is then applied to the strap first and second sides. The coated strap is conveyed through the oven to melt the powder and cure the melted powder on the strap forming the cured strap.

In an alternate method, the strap exits the "traditional" bare strap manufacturing process and powder is applied to the strap. When exiting the traditional manufacturing process, the strap is at a temperature of about 800° F. which provides a latent heat in the strap. The latent heat in the strap is used to melt the powder to form the flowable material.

When the vertical method is used, the strap is directed vertically upward a sufficient distance to cool the strap. In a current method, the strap is conveyed upwardly a distance of about 100 feet. The strap is then redirected for windup onto the storage member. The strap is redirected using at least one crowned pulley per strap. Optionally, the strap can be cooled, such as by water spray. In the vertical method, this can be carried out while in the upward traverse, the downward traverse, or both. The water spray cooling can shorten the travel distance required to cool the cured strap.

As will be recognized by those skilled in the art, in the "traditional" strap manufacturing process, multiple straps are made in parallel. That is, the straps are cut or slit from a master roll of stock. To this end, the present coating processes are also carried out in parallel processing, coating and curing multiple straps at a time.

An apparatus for making a coated strap from bare strap in an in-line strap making apparatus includes a conveyance path. The path includes a spray region having electrostatic spray guns for applying a powdered coating to each of the first and second sides and the edge regions of the bare strap. A heating region is disposed subsequent to the spray region. The heating region has a sufficient length for melting the coating on the coated strap to cover the bare strap. The heating region can include an oven, such as an infra-red oven. Preferably, the oven has zones to provide melting and curing stages for the coated strap.

A cure region is disposed subsequent to the heating region. The cure region has a predetermined length sufficient for curing of the melted powdered coating. A cooling region is disposed subsequent to the cure region. The cooling region can include a liquid spray. The cooling region has a length sufficient for the cured strap to cool and harden the coating to prevent marring or damage during windup.

In a current apparatus, the conveyance path is vertically oriented from the spray region through the curing region. In this apparatus, the length of the cooling region is about 100 feet. However, it will be recognized by those skilled in the art that the length of the cooling region can vary depending upon the desired temperature of the cured strap prior to windup, and the particular cooling scheme (e.g., water spray) used. It has been determined that with a cooling spray, a cooling region as short as about 25 feet to about 30 can provide the necessary cooling.

These and other features and advantages of the present invention will be apparent from the following detailed description, in conjunction with the appended claims.

DETAILED DESCRIPTION OF THE PREFERRED EMBODIMENTS

Figure 1:
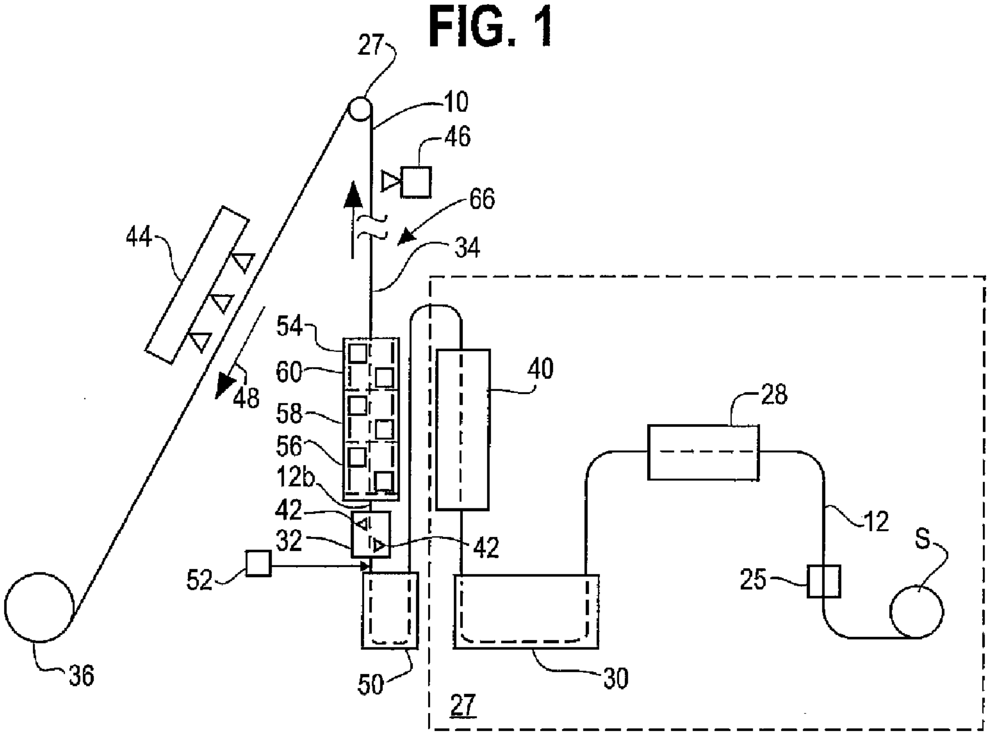
FIG. 1 is a schematic illustration of an exemplary process for making powder coated strap in accordance with the principles of the present invention, the exemplary process being a cold-strap process.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated and described.

Figure 4A:
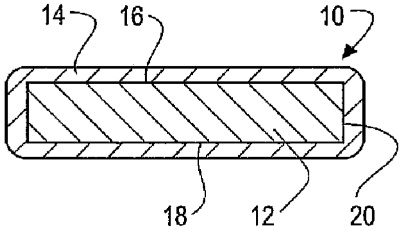
FIGS. 4*a* and 4*b* are cross-sectional views of the strap material having the powder coating thereon, with FIG. 4*a* illustrating a substantially constant thickness coating and FIG. 4*b* illustrating the dog-bone effect of the present process.
Figure 4B:
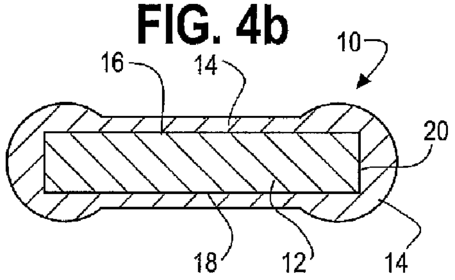

Referring now to the figures and in particular to FIGS. 4*a* and 4*b*, there are shown sections of cured strap 10 embodying the principles of the present invention. The cured strap 10 is formed from a relatively common steel bare or base strap material 12 and is formed in methods that will be recognized by those skilled in the art. Exemplary of the strap manufacturing processes are those disclosed in Krauss et al., U.S. Pat. Nos. 4,793,869 and 4,793,870, which patents are incorporated herein by reference.

The bare strap material 12 has a coating, indicated generally at 14, thereon that, when applied, provides enhanced corrosion resistance properties, compared to the bare strap material 12 and other known coating techniques. In the embodiment illustrated in FIG. 4*a*, the coating 14 is applied so as to evenly coat the bare strap 12 with a relatively consistent cross-section or thickness of coating 14. In another embodiment, as illustrated in FIG. 4*b*, the coating 14 is applied so as to result in a dog-bone cross-section or profile. This dog-bone effect will be more fully described below and with respect to the methods for making the present strap 10.

As will also be described more fully below, the coating 14 is applied to the bare strap material 12 as a powder. In this manner, when the coating 14 is applied (as a powder) to a first side 16 of the material 12 it adheres to the edges 20 of the bare strap 12, as well as the first side 16. Likewise, when the coating 14 is applied (as a powder) to the second side 18 of the bare strap 12, it adheres to the strap edges 20, as well.

In the dog-bone profile shown in FIG. 4*b*, when the coating 14 is applied to the first side 16 of the bare strap 12, it adheres to that side of the material and wraps around to also extend around a portion of the second side 18 of the material 12. Likewise, when the coating 14 is applied to the second side of the material, while the powder adheres to the second side 18, the powder also wraps around to the first side 16 of the material. Thus, because the coating extends around the edges 20 of both sides of the material, there is a slight increase or buildup at the edges 20 creating the over-coating or dog-bone profile or effect.

In a traditional or conventional method for manufacturing the strap, the base material is fed from, for example, a coil of steel S, and is slit at a slitter 25 into a desired number of strap having a desired width. The slit strap is then heat treated, as indicated at 28, to a temperature of about 1800°° F. The bare strap 12 is then treated, such as in a molten lead bath 30, which reduces the temperature below a predetermined level, preferably less than about 800° F. The strap 12 exits the lead bath 30 and is directed through a charcoal chute 40 to remove any lead that may remain on the strap 12. A more detailed discussion of the strap manufacturing process is provided in the aforementioned patents to Krauss. The traditional process steps are indicated within the box at 27 in FIGS. 1–3. The present coating method can be integrated into the traditional strap manufacturing process at this point.

The powder is applied to the bare strap material 12 at a spray booth 32 as the material 14 moves along the conveyance path. In a current method, coating and curing is carried out along a vertical conveyance path. To this end, the bare strap 12 is conveyed upwardly in a vertical manner, as indicated at 34 in FIGS. 1–2. The coated strap is heated as it rises in the vertical direction. The coated strap is then further conveyed along the path to allow the strap 10 to cool and the powder coating 14 to cure and harden. The cured strap 10 is then wound onto a storage device 36, such as a reel or spool.

Figure 2:
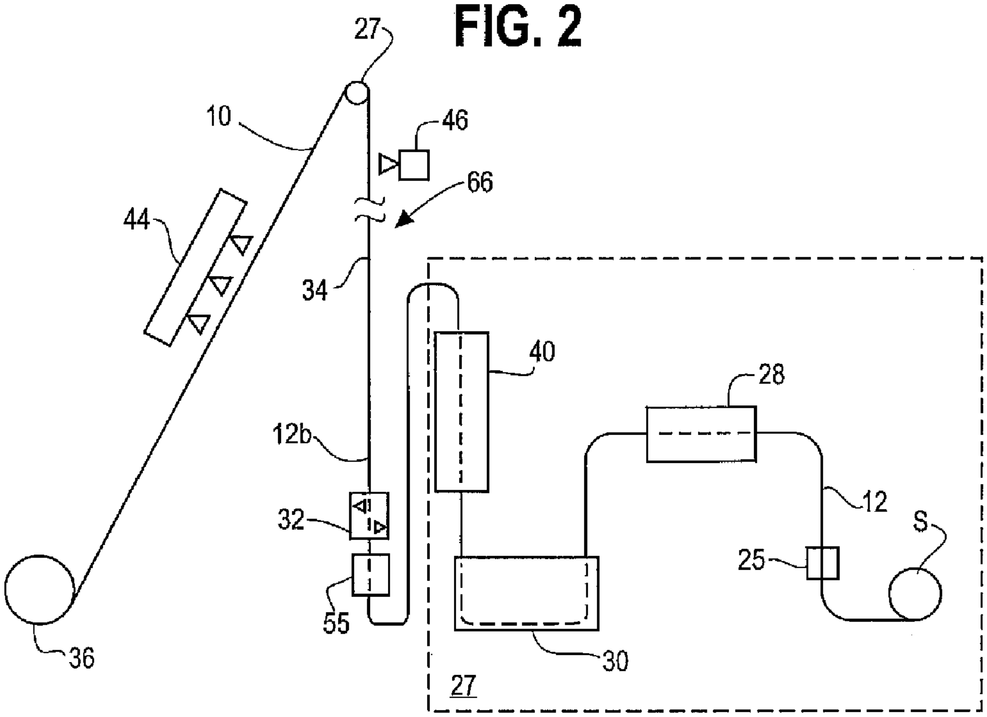
FIG. 2 is a schematic illustration of another exemplary process for making powder coated strap in accordance with the principles of the present invention, the exemplary process being a hot-strap process.
Figure 3:
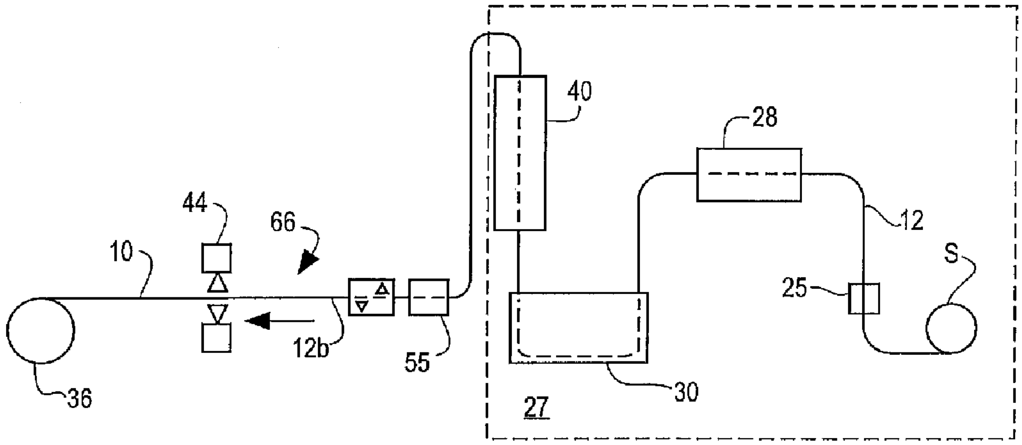
FIG. 3 is a schematic illustration of the hot-strap of FIG. 2, with the strap conveyed in a horizontal orientation.

One exemplary process, as seen in FIG. 2, is known as a hot-strap process. In this process, after the bare strap 12 exits charcoal chute 40 it is at a temperature of about 450° F. to 500° F. The bare strap 12 enters the spray booth 32 and the powder coating is applied thereto.

In a preferred application, the powder is sequentially applied from the electrostatic spray guns 42 onto the first side or surface 16 of the base material 12 and subsequently applied to the second side or surface 18 of the material 12 as it traverses past the spray guns 42. At this point in time, when using the vertical method, the strap is moving in the upwardly vertical manner. The latent heat in the bare strap 12 (after exiting the lead bath 30 and charcoal chute 40) has been found to be sufficient to melt the powder coating and subsequently cure the coating on the strapping material. In a further vertically upward section of the process, water can be sprayed onto the cured strap, as indicated at 44 and 46, to cool the coating 14 and the underlying strapping material 12. Subsequent to cooling, the cured strap 10 is redirected into a generally downwardly direction, as indicated at 48, and wound onto the spool 36.

In the hot-strap method, it is anticipated that it may be appropriate to more closely control the temperature of the straps when, for example, multiple straps are being coated in the process. To this end, temperature control may be effected by, for example, drums or booster heaters, at indicated generally at 55 in FIGS. 2 and 3. In a process in which multiple straps are coated, it may be that some of the straps, e.g., straps at the outer ends of the array, may require additional energy (heat), while others of the straps, such as the middle straps, may require that energy (heat) be removed.

In a second exemplary process, as shown schematically in FIG. 1, referred to as a cold-strap process, after the bare strap 12 exits the traditional process molten lead bath 30 and charcoal chute 40, the temperature of the bare strap 12 is further reduced by directing the strap 12 through a liquid quench tank 50. The temperature of the strap after the liquid quench is less than about 130° F. and preferably about 70° F. Although FIG. 1 illustrates, schematically, the cold-strap process carried out in a vertical orientation, those skilled in the art will appreciate that the process can be carried out in a horizontal orientation or at any incline between vertical and horizontal.

Subsequent to the water quench step, the bare strap 12 can be dried, such as with dry air, or by mechanical means, such as wipers, squeegees and the like, as indicated at 52, to eliminate residual moisture on the material 12. The powder coating is then applied to the first side 16 and the second side 18 of the bare strap 12 using the electrostatic spray guns 42 at the spray booth 32. The coated strapping (shown as 12*b*) is then conveyed through an infrared oven 54 to melt the powder and cure the coating. Upon exiting the infrared oven 54, the cured strap 10 is further conveyed through a cooling region 56 to permit the strap 10 to cool. The cured and cooled strap is then wound onto a spool or reel 36 for use. The strap 10 may be sprayed with water as indicated at 44 and 46 to further assist cool down of the strap 10.

When a vertically oriented coating process is used, the spray guns and oven are positioned in a vertical portion of the conveyance path, such that the coated and cured strap traverses upwardly through the process. The cooling region 56 can be located adjacent to and above the oven 54, or, in part, in a downward traverse of the process, prior to windup, as long as the coating 14 is sufficiently hardened.

In both the hot-strap and cold-strap methods, it has been found that the application of the powder is best carried out using an electrostatic coating process. In one current process, the coating is an epoxy material. One material for use in the cold-strap process is commercially available from the Morton Corporation as part or material number 10-7017. A material for use in the hot-strap process is available from Lilly Industries of Indianapolis, Ind. The powder coating is applied so as to establish a thickness of about 0.2 mils to about 5.0 mils, preferably, about 0.6 mils to about 1.2 mil, and most preferably about 0.8 mils. It has been found that this thickness provides sufficient coating for corrosion resistance, and can be applied so as to assure a substantially uniform coating on the base material without sacrificing this corrosion resistance.

It has been found that in both the hot-strap and the cold-strap processes, the application and curing of the powder undergoes substantially three phases. In the first phase, immediately subsequent to application, the powder begins to melt and flow, forming a coating on the strapping material. Further melting results in further flowing of the coating material to provide a relatively smooth, substantially consistent film on the strapping material. In this stage of the process, cross-linking of the material begins to occur, and the flow of material slows. At this point in time, the strapping material is substantially fully coated with the material. In the final stage of the process, the material begins to harden or cure and flow has essentially, if not entirely, stopped.

In the hot-strap process these phases occur by heating the powder material using the latent heat of the bare strap 12 after it exits the molten lead bath 30 and the charcoal chute 40. In that the temperature of the strap base material 12 is about 450° F. to about 500° F. following the charcoal chute 40, the powder readily melts upon application to the material 12. A preferred powder has the proper chemical and rheological properties so that it flows and forms a film upon melting and establishes a consistent film on the coated strap prior to curing.

In the cold-strap method, these phases are carried out in a plurality of discrete sections or zones 56, 58, 60 within the infrared oven 54. In a first zone or section 56, heating is relatively moderate at which time the powder begins to melt and flow out to coat the strap 12. A second zone 58 of the oven 54 is more aggressive, thus completing the flow of the material, essentially through completion of cross-linking of the material. In a third zone 60, curing is extremely aggressive at which time the coating 14 hardens, thus forming the cured strap 10. In the cold-strap process, curing is carried out in about six to eight seconds as the strapping material traverses through the zoned oven 54.

In a preferred hot-strap or cold-strap process, the bare strap 10 is conveyed upwardly in a vertical manner, as indicated at 34, during and subsequent to application of the powder to melt, flow-coat and cool the coating material and to further permit the strap 10 to cool. This hardens the coating 14 on the strap 10. At this point in time, the strap 10 can then be sprayed with water, as indicated at 44 and 46, to further assist cool down of the strap 10. This cool down can be carried out in either the continued upward vertical movement 34 of the strap 10, in the subsequent redirection and downward movement 58 of the strap 10, or both.

It has been found that the present methods can be, and preferably are carried out in, or as part of, an "in-line" process, thus permitting maintaining the overall operational speeds of the strapping line. Advantageously, in the present methods, the cured strap 10 can be manufactured at "in-line" speeds of up to about 180 fpm to about 220 fpm with relatively short curing times (about six to eight seconds). This provides a tremendous advantage over known processes which would, by necessity, have to be carried out either at extremely slow strap manufacturing line speeds or in subsequent processes.

As will be readily appreciated by those skilled in the art, using prior, known techniques requires a choice of either reducing the line speed or including subsequent coating processes. As will also be appreciated, either of these choices is cost prohibitive and thus unacceptable.

In the preferred methods of the present invention, the coated strap 10 is conveyed in an upwardly vertical manner for a predetermined distance, which correlates to a predetermined time period. Because of this vertical distance, which in an exemplary method is about 100 feet, the line speed can be varied to meet the required curing time. Nevertheless, the line speeds are such that there is little to no sacrifice in overall strap making line speed (i.e., process efficiency), while providing an exceptional corrosion resistant coating 14. As will also be appreciated by those skilled in the art, the curing or travel times of straps 10 will vary dependent generally upon the strap thickness. It has been found that a strap having a thickness of about 0.020 inches and a width of about ½ inch can be coated at about 180 fpm using the hot/cold strap methods. Although the exemplary method has a vertical distance of about 100 feet, it has been determined, based upon the time to reach a temperature of about 130° F. (the temperature at which the coating is sufficiently hardened), with a cooling spray and at a speed of about 180 fpm, that the distance required is about 25 feet to about 30 feet.

Table 1, below illustrates a summary of the operating conditions at which the present coated and cured straps were made using the hot-strap and cold-strap methods. In this Table, the powder material is identified as well as the strap size (width and thickness), the line speed (in feet per minute) at which the strap was coated and cured and the method of making the strap (hot-strap or cold-strap).

TABLE 1

SUMMARY OF STRAP MAKING OPERATING CONDITIONS

| Powder Material | Strap Size | Line Speed | Method |
|---|---|---|---|
| Morton Epoxy #1611029 | ¾" × 0.025" | 90–180 fpm | Cold |
| Morton Epoxy 10-7514 | ⅝" × 0.020" | 90–180 fpm | Cold |
| Morton Strap Black | ½" × 0.020" | 150 fpm | Cold |
| Morton Epoxy | ¾" × 0.031" | 150 fpm | Cold |
| 10-7107 | ½ × 0.020" | 150 fpm | Cold |
| | 1¾ × 0.035" | 140 fpm | Cold |
| Lilly Industries Clear TGIC | ¾" × 0.025" | 90 fpm | Hot |
| Lilly Industries Black Polyester | ¾" × 0.025" | 90 fpm | Hot |
| Lilly Industries Black Hybrid | ⅝" × 0.020" | 180 fpm | Hot |
| Lilly Industries | ⅝" × 0.020" | 180 fpm | Hot |
| Black Epoxy | 1¼" × 0.035" | 145 fpm | Hot |
| | 2" × 0.044" | 80 fpm | Hot |

As can be seen from Table 1, it was found that a wide range of straps sizes could be made at a substantially strap manufacturing line speeds, and thus without adverse impact on the overall strap manufacturing operation.

In a present embodiment of the cold-strap process, the zoned infrared oven 54 is an ITW BGK High Intensity Infrared Heating System utilizing tungsten quartz elements and self-cleaning ceramic reflectors, commercially available from ITW BGK of Minneapolis, Minn. The system is capable of processing steel straps ranging from about 0.017 to about 0.05 inches in thickness at line speeds of up to about 200 feet per minute. The oven 54 increases the temperature of the strapping material from about 80° F. at the oven input to about 475° F. to about 500° F. at the exit of the oven. The oven 54 is supplied with three independent zones, a pre-heat zone 56, a flow zone 58 and a cure zone 60. The oven 54 has a power rating of about 100 kW.

Figure 7:
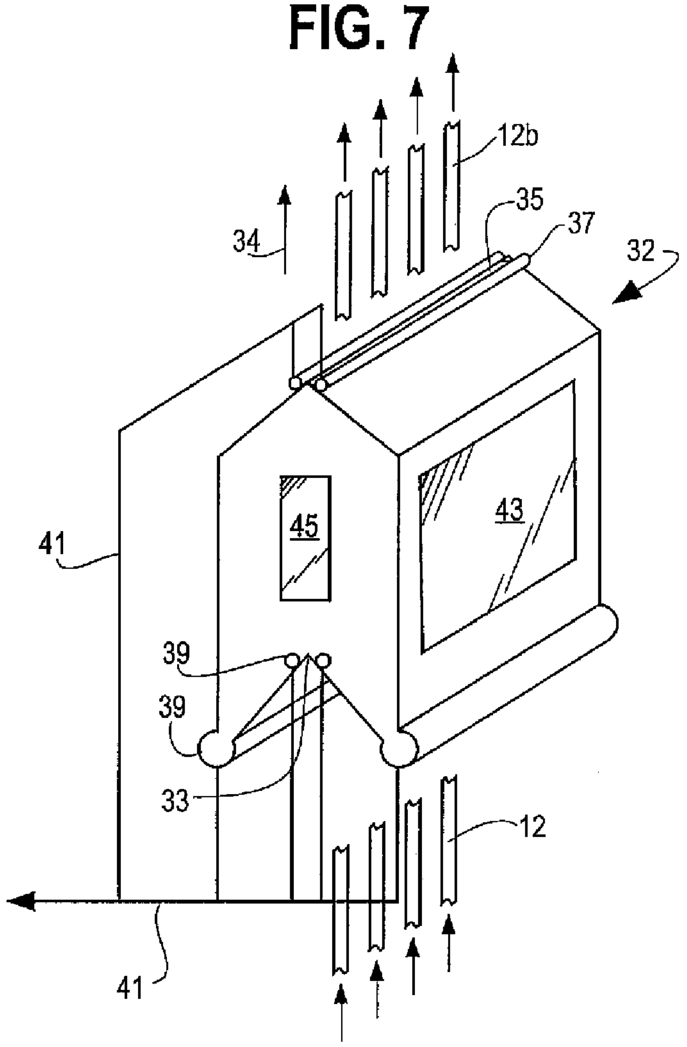
FIG. 7 illustrates one exemplary spray booth used for making the present strap.

In a current manufacturing method, the electrostatic powder spray guns 42 are corona type PG2-A automatic spray guns commercially available from ITW GEMA of Indianapolis, Ind. These spray guns 42 are used in both the cold strap and hot strap processes. An exemplary spray booth 32 is shown in FIG. 7. The booth 32 defines a part of the conveyance path 34 along which the straps 12 are directed. The booth includes a lower opening 33 and an upper opening 35, through which the straps 12 (12*b*) traverse. The spray guns (not shown in FIG. 7) are positioned within the booth 32 to apply the powder coating to the straps 12.

The booth 32 includes upper and lower hoppers 37, 39 that are configured to collect powder that does not adhere to the strap 12 (12*b*). Ducting 41 or other conveyance devices are used to convey the non-adhered powder back to the spray guns for reuse. In this manner, the powder that does not adhere to the straps can be recycled and reused in the coating process, thus providing greater economy to the coating methods. The booth 32 can include, for example, viewing windows 43 and/or access doors 45 for viewing the spraying step and/or carrying out maintenance on the enclosed spray guns.

Figure 5:
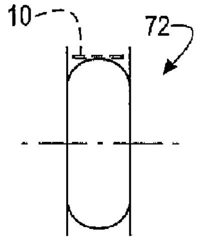
FIG. 5 illustrates a crowned pulley used in the apparatus for making the present strap.
Figure 6:
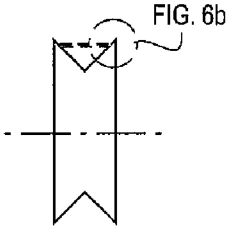
FIGS. 6 and 6*a* illustrate a V-type pulley commonly used in known strap making processes, and the cold-flow effect caused thereby.
Figure 6B:
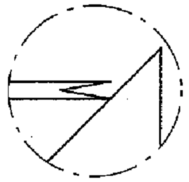

It has also been found that in the present process, it is most desirable to redirect (change orientation) of the coated strap 10 using crowned-type pulleys 72, such as that shown in FIG. 5. Known strap manufacturing processes use V-type pulleys, such as that shown in FIGS. 6 and 6*a*. It has been found that using these V-type pulleys results in abrasive removal of the material at the strap edges, which forms a concavity therein (as see FIG. 6*a*). As discussed above, the thinning of these edges results in a personnel hazard in that sharp edges can be formed. The present method which uses the crowned pulleys 72 in conjunction with the coating 14 greatly reduces or even eliminates the hazards associated with thinned, sharp edges.

As will be recognized by those skilled in the art from a study of the figures and the above description, the present in-line strap coating process provides numerous advantages over known coating processes. First, the powder spray coating and curing of the strap provides a substantially uniform coating thickness (with or without edge over-coat) on the strapping material to greatly reduce the opportunity for strap corrosion. In addition, the present method can be carried out at typical strap manufacturing line speeds, thus eliminating the need for secondary or tertiary processes to carry out the strap coating. This greatly reduces the cost and time necessary to manufacture the strap material from the base or starting material through end user product. Moreover, the present process is cost effective in that control of the thickness of the coating applied provides control over the amount of powder material needed to carry out the coating process, thus providing additional controls over the manufacturing cost.

It has also been found that the present powder coated strapping material 10 provides the ability to incorporate additives, if needed, to achieve the required slip values on the finished strap. As discussed above, slip values of less than about 15 Newton-meters are necessary for reliable tensioning during customer use. This slip permits the strap to move over itself with reduced friction so that it can be properly tensioned by the strapping machine. Unlike some known strap manufacturing processes that may require additional steps to apply wax or the like to the strap, the present method permits the use of additives in the powdered coating material that may be needed to achieve these required slip values.

In examination of strap material samples, both coated and uncoated, it has been observed that corrosion almost always commences at the edges of the strap. It is believed that this is caused by the edges of the strap riding on the V-type pulleys as well as the lack of an acceptable coating on the strap overall, and in particular at the edges. It has thus been found that the use of the crowned pulley 72 in conjunction with the present coating method prevents damage to the edges 20 of the strap 10, thus increasing the ability of the strap to resist corrosion.

Samples of cured straps were evaluated against known coated and bare strap samples to determine the increase in corrosion resistance. In each of these evaluations, "failure" was established as one pinhole of red rust visible to the human eye. In each, it was found that the present cured strap was far superior to any of the known, commercially available and commercially used products.

Four evaluations were conducted. In each of the evaluations, strap samples were cut, and the cut ends were covered to prevent corrosion initiation at the cut locations. Samples of strap prepared in accordance with the present hot-strap method and the present cold-strap method, and samples of strap having a commercially available industry standard liquid coating (Std. Liq. Coated Strap), and having a commercially available industry premium liquid coating (Prem. Liq. Coated Strap) were compared.

In a first evaluation, a Salt Spray Test, in accordance with American Society for Testing and Materials (ASTM) Standard B 117 was conducted. In this evaluation, a solution of 5 percent concentration by weight of NaCl (99.99 percent) was prepared. The strap sample were positioned in a cabinet, and a continuous fine mist of the 5 percent NaCl solution was sprayed into the cabinet. The results of this evaluation are shown below in Table 2.

TABLE 2

SALT SPRAY EVALUATION

| Strap Type | Average Hours to Failure |
|---|---|
| Hot-strap Method | 46 |
| Cold-strap Method | 46 |
| Std. Liq. Coated Strap | 3 |
| Prem. Liquid Coated Strap | 5 |

It can be seen from the results in Table 2 that the corrosion resistance of cured straps prepared in accordance with both the hot-strap and the cold-strap methods far exceeded the corrosion resistance of the standard and premium liquid coated straps vis, salt spray. In fact, the present straps exhibited a more than fifteen-fold increase over the standard liquid coated strap, and almost a ten-fold increase over the premium liquid coated strap.

In a second evaluation, referred to as a Kestemich Test, the strap samples were subjected to simulated acid rain conditions. This evaluation was carried out in accordance with Deutsches Institut fur Normung (DIN) Standard 50018 in which the strap samples were placed in a chamber that was heated to a temperature of 104° F. and in a water-sulfur dioxide atmosphere for a period of eight hours. The reaction of the water and sulfur dioxide produced sulfuric acid condensation on the straps. The straps were then rinsed and dried for sixteen hours. Each eight hour sulfuric acid atmosphere-rinse-sixteen hour dry cycle was defined a one Kesternich cycle. Table 3, below shows the results from the Kesternich testing.

TABLE 3

| KESTERNICH CYCLE EVALUATION | |
|---|---|
| Strap Type | Cycles to Failure |
| Hot-strap Method | >40 |
| Cold-strap Method | >40 |
| Std. Liq. Coated Strap | 2 |
| Prem. Liq. Coated Strap | 2 |

In the third evaluation, referred to as a prohesion evaluation, the strap samples were subjected to simulated mildly corrosive industrial environment. In such an evaluation, the samples are subjected to cycles of wet and dry, to evaluate the stretch and shrink of the coatings. This evaluation was carried out in accordance with ASTM G85. The strap samples were placed in a chamber and were subjected to an atomized "fog" of an aqueous solution of 0.35 percent ammonium sulfate and 0.05 percent sodium chloride. The strap samples were subjected to the "fog" for one hour, after which air was circulated through the chamber for one hour. This constituted one prohesion cycle. Table 4, below shows the results for the prohesion evaluations.

TABLE 4

| PROHESION CYCLE EVALUATION | |
|---|---|
| Strap Type | Cycles to Failure |
| Hot-strap Method | 265 |
| Cold-strap Method | 369 |
| Std. Liq. Coated Strap | 12 |
| Prem. Liq. Coated Strap | 48 |

The last evaluation was an ultraviolet test per ASTM D 4587. In this evaluation, strap samples subjected to cyclical exposure to ultraviolet light and moisture. The samples were placed in an apparatus to evaluate the straps' resistance to the ultraviolet component of sunlight. Each cycle consisted of four hours of exposure to UV-B 313 nm wavelength ultraviolet light at 50° C., followed by four hours of exposure to condensing moisture at 50° C. The results shown in Table 5, below, indicate the total of ultraviolet light exposure and condensation exposure hours.

TABLE 5

| ULTRAVIOLET LIGHT EVALUATION | |
|---|---|
| Strap Type | Hours to Failure |
| Hot-strap Method | Not evaluated |
| Cold-strap Method | >3306 |
| Std. Liq. Coated Strap | 65 |
| Prem. Liq. Coated Strap | 336 |

It can be seen from the results of Tables 2–5, above that the corrosion resistance characteristics of the present coated and cured strap far exceed the corrosion resistance characteristics of the standard liquid coated strap and the premium liquid coated strap. These characteristics, in conjunction with the ability to make the present strap in an in-line traditional strap manufacturing process provide an improved, cost-effective strap product for use in any strap application.

Although the above description refers to an epoxy spray coating material, it is anticipated that other materials having the necessary chemical, rheological and mechanical properties will function well as a coating material. For example, it is contemplated that polyesters, urethanes, hybrids and the like will function well as coating materials. All such other materials are within the scope and spirit of the present invention.

In addition, although the above disclosure refers to and addresses strap, it will be recognized and appreciated by those skilled in the art that other material profiles, such as wire, tubing, beam-like cross-sections, perforated metals and the like can be coated in accordance with the methods and apparatuses disclosed herein. All such other profiles are within the scope and spirit of the present invention.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A corrosion-resistant coated and cured strap comprising;

an elongated metal strap base element, the metal strap base element having a width defining first and second sides and a thickness defining a pair of opposing edge regions; and a melted and cured powder coating on the base element, the coating having a first substantially consistent thickness at the first and second sides and a second substantially consistent thickness at the edge regions, the first and second thicknesses being different from one another, wherein the coating has a greater thickness at about the pair of opposing edge regions and about regions of the first and second sides adjacent the pair of opposing edge regions than on the first and second sides to define a dog-bone profile.

2. The corrosion-resistant strap in accordance with claim 1 wherein the first thickness of the coating is about 0.2 thousandths of an inch to about 5.0 thousandths of an inch.

3. The corrosion-resistant strap in accordance with claim 1 wherein the first thickness of the coating is about 0.6 thousandths of an inch to about 12 thousandths of an inch.

4. The corrosion-resistant strap in accordance with claim 3 wherein the first thickness of the coating is about 0.8 thousandths of an inch.

* * * * *